Nov. 19, 1946.   W. A. KENNEDY ET AL   2,411,273
DEVICE FOR INDICATING THE UNAUTHORIZED OPERATION OF REGISTERS
Filed Dec. 14, 1945   3 Sheets-Sheet 1
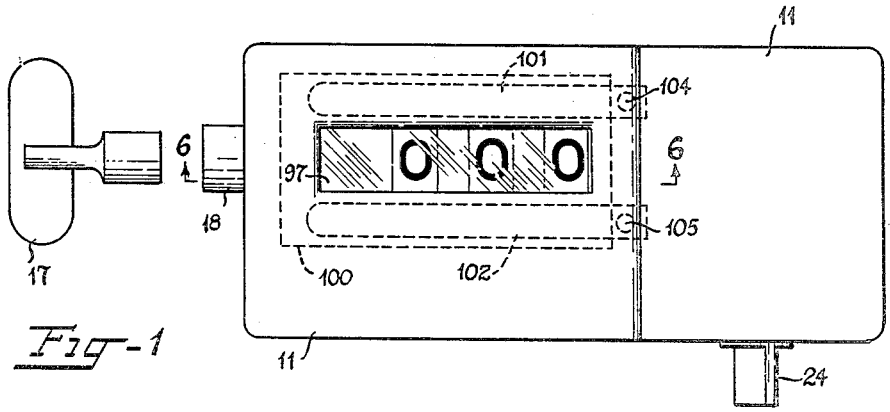
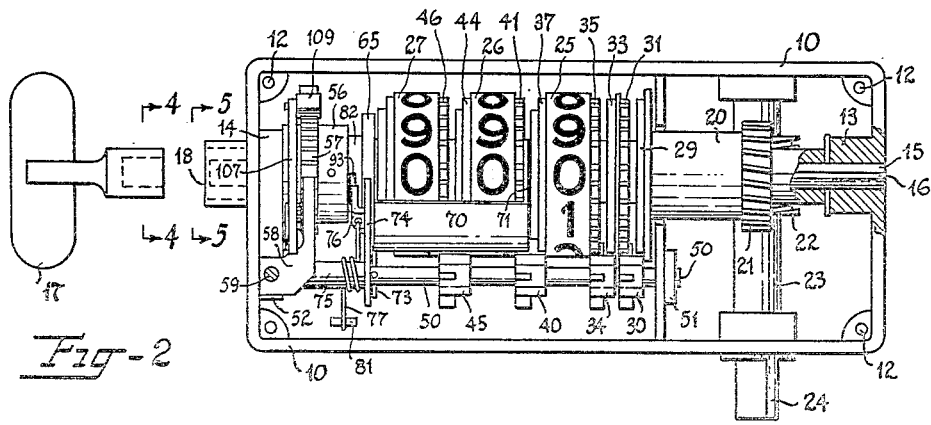
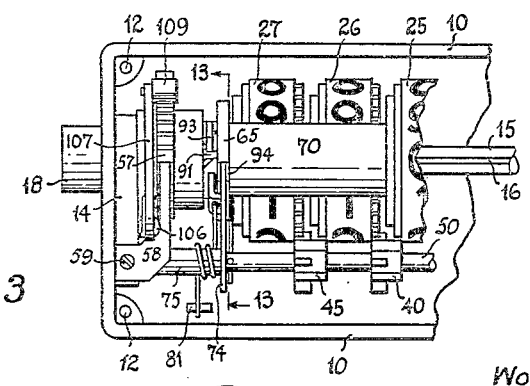
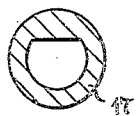
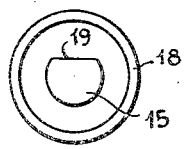
Woodford A. Kennedy
Beverly A. Southerland
Inventors

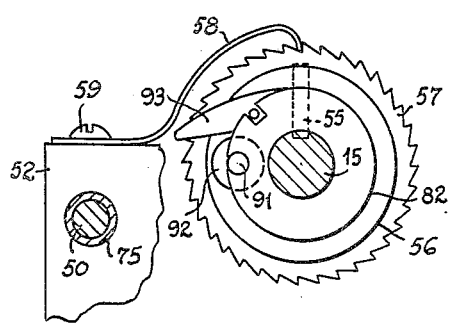
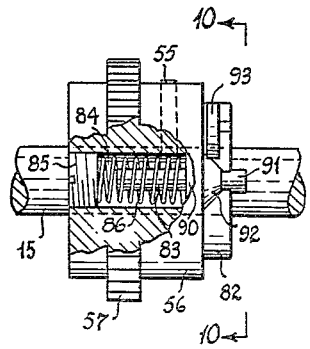
Fig-10   Fig-9
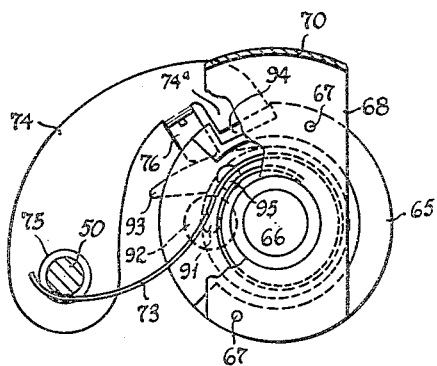
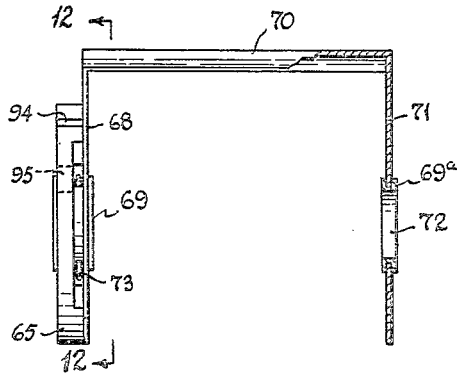
Fig-12   Fig-11
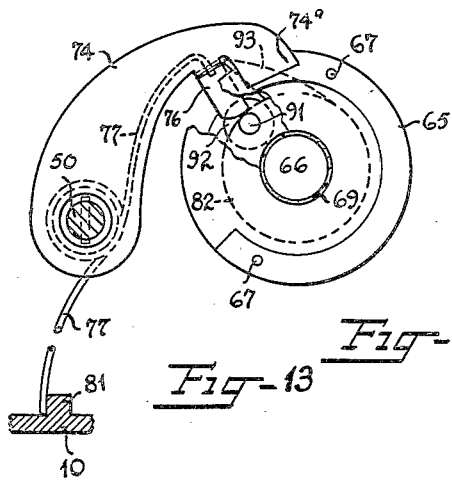
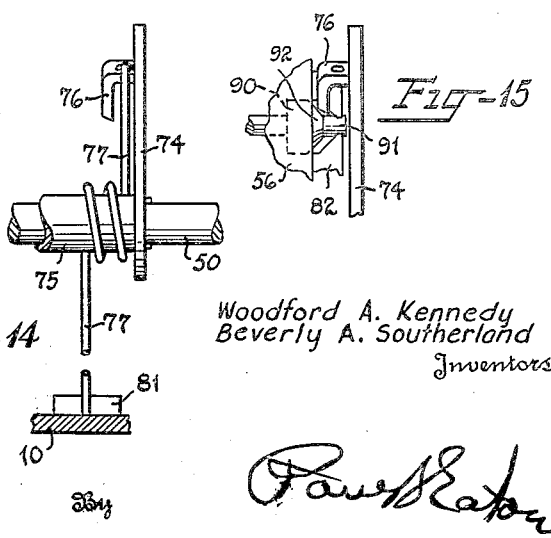
Fig-13   Fig-14   Fig-15

Patented Nov. 19, 1946

2,411,273

UNITED STATES PATENT OFFICE 2,411,273

DEVICE FOR INDICATING THE UNAUTHORIZED OPERATION OF REGISTERS

Woodford A. Kennedy and Beverly A. Southerland, Charlotte, N. C.; said Southerland assignor to said Kennedy Application December 14, 1945, Serial No. 634,981

8 Claims. (Cl. 235—1)

This invention relates to a counter and, more especially, to a counter adapted for use with looms and the like and commonly known as a pick counter. It is of course evident that this counter could be used with any machine for indicating various operations of the machine.

It is an object of this invention to provide a counter having means for shielding from view one or more of the counting wheels and adapted to move into shielding position when the counter is tampered with in an unauthorized manner.

It is another object of this invention to provide a counter equipped with means for preventing reverse rotation of the counter shaft and, also, having means associated with the counter shaft on which the counting wheels are mounted which is adapted to be brought into shielding position to shield the numbers on the counting wheels from being read through a window in the casing when the shaft on which the counting wheels are mounted is moved by an unauthorized person.

It is another object of this invention to provide in a counter having a shaft on which a plurality of counting wheels are mounted, a shield normally held in non-shielding position relative to the counter wheels but which is adapted to be moved over a window through which the counting wheels are visible; and when any tampering with a transparent sheet through which the counting wheels are visible occurs, such as pressure on the transparent sheet, such pressure serves to rotate the counter shaft and thus causes the shield to move between the counting wheels and the sheet to thus obscure the counting wheels from view by a person looking through the sheet from the outside.

Some of the objects of the invention having been stated, other objects will appear as the description proceeds when taken in connection with the accompanying drawings, in which—

Figure 1 is a front elevation of the counter with its lid in position and showing the key removed some distance therefrom;

Figure 2 is a view similar to Figure 1 with the cover removed;

Figure 3 is a view showing the left hand side of Figure 2 and showing the shield in shielding position between the counter wheels and the window through which they are visible;

Figure 4 is a sectional view of the key taken substantially along the line 4—4 in Figure 2;

Figure 5 is an elevation of the keyway from along the line 5—5 in Figure 2;

Figure 9 is an elevation, with portions thereof broken away, of the ratchet wheel and associated parts mounted on the counter shaft;

Figure 10 is an elevation with the counter shaft in section and looking from along the line 10—10 in Figure 9;

Figure 11 is an elevation of the shield member and associated parts, disassociated from the other mechanism and omitting the dog 74;

Figure 12 is a sectional and elevational view taken along the line 12—12 in Figure 11 with dog 74 added;

Figure 13 is a view taken along the line 13—13 in Figure 3 and omitting the counter shaft on which the hub portion of the shield member is mounted;

Figure 14 is an elevation looking from the left hand side of Figure 13 and omitting disk 65;

Figure 15 is a detail showing how a blow of the spring-pressed pawl releases the shield mechanism from the counter shaft.

Figure 6:
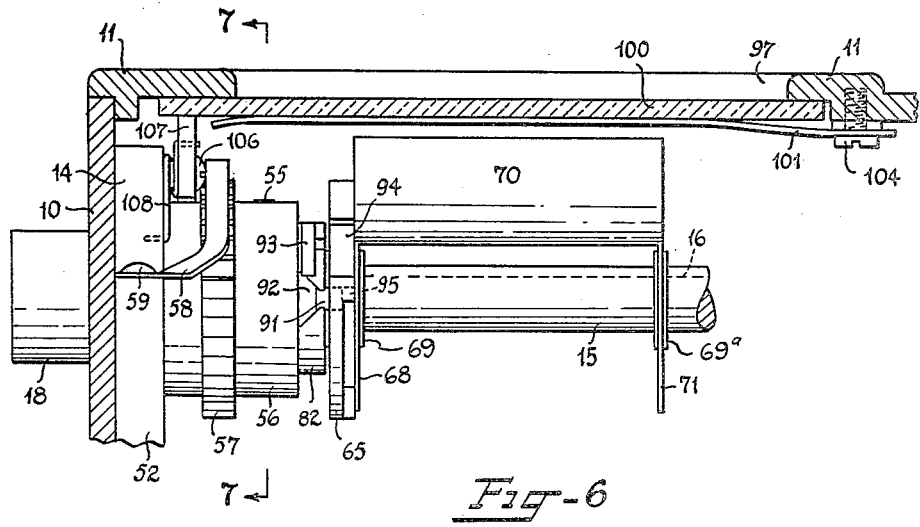
Figure 6 is a sectional view taken along the line 6—6 in Figure 1 at the cover and showing the upper portion of the counter mechanism and with the counter wheels and Geneva shaft omitted, and the lower portion of the view being taken immediately inside the lower wall of the casing, and omitting the dog and spring associated with the shield member.
Figure 7:
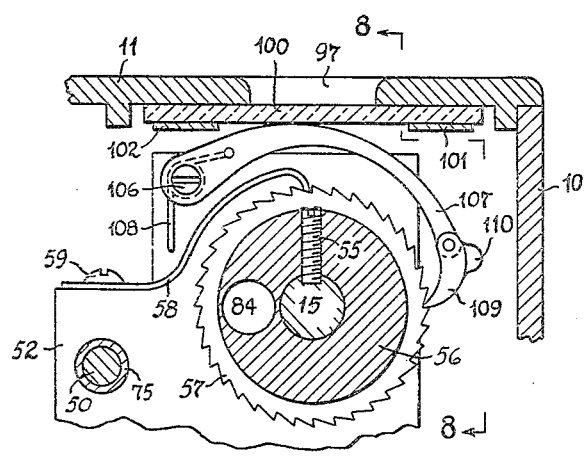
Figure 7 is a sectional view taken along the line 7—7 in Figure 6.
Figure 8:
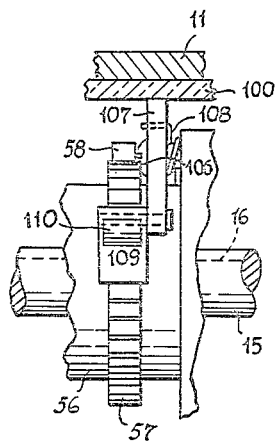
Figure 8 is a sectional and elevational view taken along the line 8—8 in Figure 7.

Referring more specifically to the drawings, the numeral 10 indicates a casing for a counter which is shown as a single counter, but usually, one case is large enough to hold to or three different counting mechanisms. The counting mechanisms being identical to each other, only one counter is shown in these drawings. The counter casing is usually equipped with a lid 11, and there are usually screws passing through the back of the casing and up through holes 12 and are threadably embedded in the back side of the cover 11, but do not penetrate the same. The counter casing usually has a thickened portion 13 at one end and another thickened portion 14 at the other end in which a shaft 15 is rotatably mounted.

Shaft 15 has extending throughout the length thereof, or over to a point adjacent the left hand end of the casing, a longitudinally disposed groove 16 in which suitable dogs on the inside of the counter wheels are adapted to be pressed by a suitable leaf spring for resetting operations, the counter wheels and associated parts being of a structure as shown in the patent to Kennedy et al., No. 2,224,396, of December 10, 1940.

Rotatably mounted on shaft 15 is a sleeve 20 having a worm gear 21 integral therewith which meshes with a suitable worm 22 on a drive shaft 23 which is driven from some suitable connections to the machine with which the counter is associated by such connections being connected to the exterior portion 24 of the shaft 23.

Shaft 15 has mounted thereon a plurality of counting wheels of a structure as shown in the said patent to Kennedy et al., said counter wheels being indicated by reference characters 25, 26, and 27. The disk 20 has integral therewith a portion 29 which has a suitable notch therein for engaging the long teeth on a Geneva wheel 30 which causes the teeth to engage a gear 31. The gear 31 usually has associated therewith a disk 33 which, in this instance, has two notches therein for engaging the long teeth on the Geneva gear 34 which causes the teeth on this Geneva pinion 34 to engage the teeth in a disk 35 associated with counter wheel 25.

Counter wheel 25 has a disk 37 associated therewith which has a notch therein adapted to engage the long teeth of Geneva pinion 40, which causes the teeth to engage gear 41 on counter wheel 26 to impart step-by-step movement thereto. The counter wheel 26 has a disk 44 associated therewith, which has a notch in its periphery adapted to engage the long teeth in Geneva pinion 45 and which causes the teeth to engage a notch in a gear 46 secured to counter wheel 27 to impart step-by-step rotation thereto.

All of the Geneva pinions 30, 34, 40 and 45 are freely mounted for rotation on a shaft 50 which is fixed in uprising portions 51 and 52 forming a part of the casing 10. The shaft 15 has fixedly secured thereon by a pin 55, a hub portion 56 having integral therewith a ratchet wheel 57 which has a spring dog 58 engaging the same and fixedly secured as at 59 on a portion 52 of the interior of the casing. This prevents the shaft 15 from being turned in a reverse direction, or in a clockwise direction if one were standing and looking towards the left hand end of Figures 1 and 2.

Shielding means are provided for shielding the counter wheels 26 and 27 and this shield could be extended to cover even counter wheel 25, or it could be shortened to cover only counter wheel 27. This shield is freely mounted on shaft 15 and comprises a disk-like portion 65. This disk 65 has a hole 66 therethrough loosely penetrated by the shaft 15. Fixedly secured to the disk 65 by means of rivets 67 is a sheet metal portion 68 having a horizontally extending shielding portion 70, which is disposed to cover a portion only of the counter wheels 26 and 27. The leg 68 has a spacer 69 thereon which is loosely penetrated by the shaft 15. The shielding portion 70 has another leg portion 71 provided with a spacer 69a having a hole 72 therein, also loosely penetrated by the shaft 15.

Between the disk 65 and the leg 68 of the shield member, there is disposed a compression spring 73 which is anchored at one end to the disk 65, and its other end extends downwardly in Figure 2, or to the left in Figure 12, and hooks underneath the shaft 50. This spring is normally biased to move the shield 70 to the position shown in Figure 2. Mounted for oscillation on the shaft 50 is a dog 74 and this dog has an outwardly and downwardly projecting portion 76 near its free end into which one end of a torsion spring 77 is secured, the torsion spring having several convolutions around a sleeve 75 which is integral with the dog 74. The other end of spring 77 rests against a projection 81 on the bottom of casing 10. This urges the upper free end of the dog away from the observer in Figures 2 and 3, or, in a clockwise manner in Figures 12 and 13.

Sleeve 56 has a restricted circular portion 82 and mounted in sleeve 56 is a plunger 83 which is mounted in a bore 84 in the sleeve and the plug 85 closes one end of this bore to confine a compression spring 86 surrounding the plunger 83. The right hand end of this plunger, in Figure 9 for example, has an enlarged portion 90 which converges into a smaller end portion 91, thus forming a sloping portion 92.

On the restricted portion 82, there is mounted a cam member 93, which, when the shaft 15 is rotated, tends to ride under the projection 76 of dog 74 and raises it upwardly until the free end 74a of the dog is moved out of a notch 94 in the periphery of disk 65. When the free end 74a has cleared the notch 94, the pressure of spring 73 will cause the disk 65 and shield 70 to move from the position shown in Figure 3 to the position shown in Figure 2. Thus, when any unauthorized turning of shaft 15 occurs, it immediately tends to cause the cam 93 to raise the dog 74 by engaging its portion 76 and, before it falls back downwardly, it has been raised sufficiently to cause it to have sufficient force to strike against the sloping shoulder 92 and move the plunger 91 out of a hole 95 in disk 65, thus allowing shaft 15 and hub portion 56 and associated parts to continue rotating in a counterclockwise fashion a full turn to bring the counting wheels 25, 26, 27, to a zero position.

With the parts in the position shown in Figure 2, and shaft 15 being turned, end portion 91 of the plunger will be resting in hole 95 in disk 65. This will move the shield 70 from the position shown in Figure 2 along with the counting wheels to the position shown in Figure 3; and, while this is happening, the cam 93 is sliding beneath portion 76 of dog 74 and raising it upwardly. And, when the shield 70 reaches the position shown in Figure 3, the portion 76 will pass from over the end of cam 93 and under influence of its spring 77 will fall downwardly and strike the sloping portion 92 of plunger 83 and move it to the left in Figure 9 to where its smaller end portion 91 will be disengaged from the hole 95 in disk 65 and, portion 74a will engage notch 94 in disk 65 thus holding shield 70 in position during the completion of a full turn of shaft 15. Thus, the shield 70 will be left in the position shown in Figure 3, being immediately below a window 97 in the cover 11, and in this way will prevent reading of the counter through the window. This will indicate to the supervisor that someone has been unauthorizedly tampering with the counter and has rotated the shaft. In order to reset the shield to the position shown in Figure 2, the supervisor will then take a suitable key 17, insert it into a housing or keyway 18 and engage the end of shaft 15 which is keyed as at 19 for turning, and rotate the shaft 15 the balance of a complete revolution; and, when this revolution has almost been completed, the portion 76 of dog 74 will be again riding upwardly on cam 93 which will release the portion 74a of dog 74 from the notch 94 in disk 65 which will allow the spring 73 to rotate the shield to the position shown in Figure 2, and thus, from beneath the window 97.

With the parts in the position shown in Figure 2, and as has already been explained, a slight rotation of the shaft 15 will cause the shield 70 to move up to a securing position as shown in Figure 3.

In other words, cam portion 93 and plunger 91 are coordinated in a fixed position on shaft 15 relative to groove 16 in shaft 15 by screw 55 so that in resetting the counting wheels, groove 16 engages dogs inside of the counting wheels to bring them all to zero position as shown in Figures 1 and 2; thus the end portion 74a of dog 74 is out of notch 94 and portion 76 of dog 74 is raised part way on cam 93 and plunger 91 is engaged in hole 95 of disk 65. The machine in this position, as shown in Figure 2, is ready for operation. Any turning of shaft 15 now will cause shield 70 to rise to the position shown in Figure 3.

It is a well known fact that many operators of machines with which counters are associated endeavor to break a pane of glass covering the window or windows of the counters in order to apply external force to the counter wheels to change the setting of same and, thus, defraud the owner of the machine in causing the owner to pay for more production on the machine than has actually been accomplished. We have provided means to overcome this difficulty by, instead of having a single pane of glass for each counter fixedly mounted in the cover 11, by loosely mounting a pane of glass 100 immediately beneath the window 97 on leaf springs 101 and 102 which are secured to the cover as at 104 and 105. This leaves the free ends of these springs free to move downwardly and, together with the pane of glass 100 supported by the same.

Immediately under the free end of the pane of glass 100 there is provided a pivot pin 106 on which is pivoted a dog 107 which is normally biased to rest at all times against the pane 100 by means of a torsion spring 108. The free end of this dog 107 has pivotally secured thereto a pawl 109 having a weighted portion 110 to cause its pointed end to engage the teeth in ratchet wheel 57 mounted on shaft 15 at all times. Thus, when inward pressure is applied to the pane 100, this will impart pressure to the dog 107 which will cause its portion 109 to advance the ratchet wheel 57 and this, being affixed to shaft 15, will advance the shaft 15 and move the shield 70 up over the opening or window 97 and, thus, it will be a clear indication to the supervisor that the operator of the machine has endeavored to gain access to the interior of the counter to change the setting of the counter wheel.

It is preferable to use an unbreakable type of glass for the pane 100 as this can be glass, or, it can be a plastic transparent material. The plastic transparent material is preferable as it cannot be broken but will absorb pressure to transmit it to the ratchet wheel 57.

In the drawings and specification there has been set forth a preferred embodiment of the invention, and although specific terms are employed, they are used in a generic and descriptive sense only, and not for purposes of limitation, the scope of the invention being defined in the claims.

We claim:

1. A counter having a rotatable shaft on which a plurality of counting wheels are rotatably mounted, said counter having a casing and a window in the casing having a transparent pane covering the same, through which the counting wheels are visible, a shield member oscillatably mounted on the shaft on which the counting wheels are mounted, spring means normally tending to move the shield to a position where it will not be visible through the window, and means on the shaft releasably connected to the shield for engaging the shield when the shaft is turned to move the shield to a position between the window and that portion of the counting wheels appearing immediately adjacent the window.

2. A counter having a rotatable shaft on which a plurality of counting wheels are rotatably mounted, said counter having a casing and a window in the casing having a transparent pane covering the same, through which the counting wheels are visible, a shield member oscillatably mounted on the shaft on which the counting wheels are mounted, spring means normally tending to move the shield to a position where it will not be visible through the window, means on the shaft releasably connected to the shield for engaging the shield when the shaft is turned to move the shield to a position between the window and that portion of the counting wheels appearing immediately adjacent the window, means mounted within the casing and adapted to be depressed by pressure applied on the pane, and a ratchet wheel mounted on the shaft and engageable by said means which are depressed by inward pressure applied on the pane to thus rotate the shaft to cause the shield to move to a position between the window and the counting wheels.

3. In a counter having a rotatable shaft provided with a plurality of counting wheels rotatably mounted on the shaft, a shield member oscillatably mounted on the shaft, said counter having a casing and a cover for the same and an opening in the cover and a transparent pane disposed immediately inside the covering between the opening and the counting wheels and through which a portion of the counting wheels are visible, spring means normally moving the shield member to a position away from the window, means operable by the turning of the shaft on which the wheels are mounted for moving the shield to the position between the window and the counting wheels to obscure the counting wheels from view to one on the exterior of the casing, said shaft having a ratchet wheel mounted thereon, a dog member pivoted in the casing and having one end adapted to engage the ratchet wheel, spring means resiliently mounting the transparent pane covering the window, exterior inwardly directed pressure on the transparent pane covering the window being adapted to engage said dog to move said ratchet wheel to thus partially rotate the shaft on which the counting wheels are mounted to move the shield member to a position between the transparent pane and the counting wheels adjacent thereto.

4. In a counter having a casing and a rotatable shaft mounted in the casing, and a plurality of counting wheels rotatably mounted on the shaft, a cover for the casing having an opening therein, a transparent pane disposed below and closing the opening, a shield for the counting wheels mounted on the shaft and normally held away from the window, resiliently mounted means for supporting the transparent pane, the shaft having a ratchet wheel thereon, a dog pivoted at one end to the casing and having its other end adapted to engage the ratchet wheel, a portion of said dog being disposed in close proximity to said transparent pane whereby inward pressure on the transparent pane closing the window will move the dog to move the ratchet wheel to thus partially rotate the shaft to thus bring the shield member to a position between the transparent pane and the counting wheels to obscure view of the counting wheels through the window.

5. In a counter having a casing and a shaft rotatably mounted in the casing and said shaft having a plurality of counting wheels rotatably mounted thereon, a cover for the casing and a window in the cover and a transparent pane closing said window, the counting wheels being visible through the window in the cover, a shield member having a portion disposed in parallel relation to the shaft and covering a portion of the counting wheels, a disk secured to one leg of the shield member and being rotatably mounted on said shaft, said disk having a notch therein, a spring-pressed dog being adapted to fall into said notch and to hold the shield member in a position between the window and the counting wheels to obscure view of the counting wheels through the window, a radially disposed portion of the shield member having a disk secured thereto with a notch in its periphery, the free end of the dog being adapted to rest in said notch to hold it in a position between the window and the counting wheels, said sleeve member having a spring-pressed plunger therein and said disk having a cavity therein into which the spring-pressed plunger is adapted to fall through the disk and associated shield member with the shaft, said sleeve member having a cam thereon and said dog having a laterally and inwardly projected portion whereby the dog will be raised out of the notch in the disk and a spring associated therewith will move the shield to non-shielding position, and further rotation of the shaft will cause the plunger to move into the cavity in the disk while the projection on the dog is riding on the said cam until the disk has been moved to a position between the window and the counting wheels and when the shaft has been rotated sufficiently to cause the laterally and inwardly projecting portion on the dog to fall off the end of the cam, the laterally and inwardly projecting portion of the dog will strike the sloping end of the plunger and remove it from the cavity in said disk at the point where the shield is disposed between the window and the counting wheels and thus disconnect the shaft from the disk associated with the shield member for the turning of the shaft and the counting wheels without imparting any further movement to the disk covering a portion of the counting wheels.

6. A counter having a rotatable shaft on which a plurality of counting wheels are rotatably mounted, said counter having a casing and a window in the casing having a transparent pane covering the same, through which the counting wheels are visible, a shield member oscillatably mounted on the shaft on which the counting wheels are mounted, spring means normally tending to move the shield to a position where it will not be visible through the window, means on the shaft releasably connected to the shield for engaging the shield when the shaft is turned to move the shield to a position between the window and that portion of the counting wheels appearing immediately adjacent the window, means for disengaging the shield from the shaft when the shield has been moved to a position between the window and counting wheels, and means for engaging the shield and holding it in the position to which it has been moved by rotation of the shaft.

7. A counter having a rotatable shaft on which a plurality of counting wheels are rotatably mounted, said counter having a casing and a window in the casing having a transparent pane covering the same, through which the counting wheels are visible, a shield member oscillatably mounted on the shaft on which the counting wheels are mounted, spring means normally tending to move the shield to a position where it will not be visible through the window, means on the shaft releasably connected to the shield for engaging the shield when the shaft is turned to move the shield to a position between the window and that portion of the counting wheels appearing immediately adjacent the window, means mounted within the casing and adapted to be depressed by pressure applied on the pane, a ratchet wheel mounted on the shaft and engageable by said means which are depressed by inward pressure applied on the pane to thus rotate the shaft to cause the shield to move to a position between the window and the counting wheels, means for disengaging the shield from the shaft when the shield has been moved to a position between the window and counting wheels, and means for engaging the shield and holding it in the position to which it has been moved by rotation of the shaft.

8. In a counter having a rotatable shaft provided with a plurality of counting wheels rotatably mounted on the shaft, a shield member oscillatably mounted on the shaft, said counter having a casing and a cover for the same and an opening in the cover and a transparent pane disposed immediately inside the covering between the opening and the counting wheels and through which a portion of the counting wheels are visible, spring means normally moving the shield member to a position away from the window, means operable by the turning of the shaft on which the wheels are mounted for moving the shield to the position between the window and the counting wheels to obscure the counting wheels from view to one on the exterior of the casing, means for disengaging the shield from the shaft when the shield has been moved to a position between the window and counting wheels, and means for engaging the shield and holding it in the position to which it has been moved by rotation of the shaft.

WOODFORD A. KENNEDY.
BEVERLY A. SOUTHERLAND.